United States Patent
Takushima et al.

(10) Patent No.: US 7,457,497 B2
(45) Date of Patent: Nov. 25, 2008

(54) OPTICAL MULTIPLEXER/DEMULTIPLEXER AND OPTICAL COMMUNICATION SYSTEM

(75) Inventors: Michiko Takushima, Yokohama (JP); Kenichiro Takahashi, Yokohama (JP); Akira Inoue, Yokohama (JP); Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 35 days.

(21) Appl. No.: 11/197,777

(22) Filed: Aug. 5, 2005

(65) Prior Publication Data

US 2006/0029329 A1 Feb. 9, 2006

Related U.S. Application Data

(60) Provisional application No. 60/600,774, filed on Aug. 12, 2004.

(30) Foreign Application Priority Data

Aug. 5, 2004 (JP) ............................ P2004-229829

(51) Int. Cl.
*G02B 6/26* (2006.01)
(52) U.S. Cl. ........................................................ 385/39
(58) Field of Classification Search ................ None
See application file for complete search history.

(56) References Cited

U.S. PATENT DOCUMENTS

2004/0223682 A1* 11/2004 Ding et al. .................... 385/14
2004/0228573 A1* 11/2004 Terakawa et al. ............. 385/24

FOREIGN PATENT DOCUMENTS

| JP | 2-034806 | 2/1990 |
|---|---|---|
| JP | 4-346527 | 12/1992 |
| JP | 6-059143 | 3/1994 |
| JP | 9-73019 | 3/1997 |
| JP | 10-300956 | 11/1998 |
| JP | 2000-111750 | 4/2000 |
| JP | 2002-090560 | 3/2002 |
| JP | 2004-046020 | 2/2004 |

OTHER PUBLICATIONS

M. Yanagisawa, et al., "Low-loss and compact TFF-embedded silica-waveguide WDM filter for video distribution services in FTTH systems," OFC2004, Tu14.
Japanese Office Action, with English translation, issued in Japanese Patent Application No. JP 2004-229829, mailed Jun. 24, 2008.

* cited by examiner

*Primary Examiner*—Frank G Font
*Assistant Examiner*—Eric Wong
(74) *Attorney, Agent, or Firm*—McDermott Will & Emery LLP

(57) ABSTRACT

The optical multiplexer/demultiplexer 100 includes a member 110 on which optical waveguides 111 to 114 and a groove 115 are formed and an optical filter 120 inserted in the groove 115. The member 110 is a planar optical waveguide where the optical waveguides 111 to 114 are formed on one surface thereof, and the groove 115 is formed thereon. Before the groove 115 is formed, the optical wave guide 111 and the optical waveguide 114 are a continuous optical waveguide; and the optical waveguide 112 and the optical waveguide 113 are a continuous optical waveguide. A straight groove 115 is formed so as to go through an intersecting point of the two continuous optical waveguides. The optical waveguides 111 and 114 are formed straightly on the member 110.

17 Claims, 6 Drawing Sheets

OPTICAL MULTIPLEXER/DEMULTIPLEXER AND OPTICAL COMMUNICATION SYSTEM

CROSS-REFERENCE TO RELATED APPLICATION

This application claims priority to Provisional Application Ser. No. 60/600,774 filed on Aug. 12, 2004 which is hereby incorporated by reference in its entirety.

BACKGROUND OF THE INVENTION

1. Field of the Invention

The present invention relates to an optical communication system that transmits optical signals including a plurality of wavelengths, and, to an optical multiplexer/demultiplexer used in such optical communication system or the like.

2. Related Background of the Invention

In an optical communication system, which transmits optical signals including a plurality of wavelengths, an optical multiplexer/demultiplexer for multiplexing or demultiplexing these optical signals including the plurality of wavelengths is used. Particularly, in an optical communication system (FTTH: fiber to the home) between end office and subscriber's home, the optical multiplexer/demultiplexer is required to be small in size and moderate in price.

In an optical multiplexer/demultiplexer disclose in M. Yanagisawa, et al., "Low-loss and compact TFF-embedded silica-waveguide WDM filter for video distribution services in FTTH systems" OFC 2004, TuI 4, for example, two optical waveguides are formed so as to cross with each other on a member, a V-groove is formed so as to go through the cross section thereof and an optical filter is inserted in the V-groove and fixed therein with an adhesive agent. In the optical multiplexer/demultiplexer, among light components guided through one optical waveguide and reached to the V-groove, a light component of a certain wavelength is transmitted by the optical filter and is further guided through the one optical waveguide; and a light component of other wavelength is reflected by the optical filter, and guided through the other optical waveguide.

SUMMARY OF THE INVENTION

Generally, the optical multiplexer/demultiplexer disclosed in the above document is used by optically connecting the optical waveguides with optical fiber arrays at edge faces of the member. Therefore, it is preferred that the optical axes of the optical waveguides are parallel with each other on the edge faces of the member. Hence, in the optical multiplexer/demultiplexer disclosed in the document, every optical waveguides have curved portions.

However, when an optical waveguide has a curved portion, since a part of light guided in the optical waveguide leaks outside at the curved portion, the loss tends to occur. The longer the wavelength of the guided light component is, and the smaller the radius of curvature of the curved portion is, the larger the loss becomes. Particularly, when the optical multiplexer/demultiplexer is miniaturized, the radius of curvature of the curved portion has to be smaller causing the problem of loss to increase.

In view of the above problems, the present invention has been proposed. It is an object of the present invention to provide an optical multiplexer/demultiplexer capable of reducing the loss, and an optical communication system equipped with such optical multiplexer/demultiplexer.

A first optical multiplexer/demultiplexer in accordance with the present invention is characterized in that an optical filter is inserted in a groove formed on a member; on a first side of the member with respect to the groove, a first optical waveguide and a second optical waveguide are formed so as to reach to the groove; on a second side of the member with respect to the groove, a third optical waveguide is formed so as to reach to the groove; the first optical waveguide or the second optical waveguide is straight on the member; among light components included in light which have propagated through the first optical waveguide and outputted to the groove, the optical filter allows a light component which has been transmitted by the optical filter to enter into the third optical waveguide, and allows a light component which has been reflected by the optical filter to enter into the second optical waveguide. Here, the optical filter is preferably a dielectric multilayered filter.

That is, the first optical multiplexer/demultiplexer in accordance with the present invention includes the first optical waveguide, the second optical waveguide, the third optical waveguide and the optical filter. The first optical waveguide is provided on the first side of the member. The member has the first side and the second side defined by the groove. The first optical waveguide has one end exposed to the groove. The second optical waveguide is provided on the first side and has one end exposed to the groove. The third optical waveguide is provided on the second side and has one end exposed to the groove. The optical filter is inserted in the groove. The first optical waveguide or the second optical waveguide is provided along a straight line. The first optical waveguide and the third optical waveguide are optically connected with each other by transmission of the optical filter. The first optical waveguide and the second optical waveguide are optically connected with each other by reflection of the optical filter.

In the optical multiplexer/demultiplexer, the first optical waveguide or the second optical waveguide is straight on the member. Accordingly, by guiding a light component of a long wavelength in the straight waveguide and guiding a light component of a short wavelength in the optical waveguide having the curved portion, the loss of the optical multiplexer/demultiplexer can be reduced.

A second optical multiplexer/demultiplexer of the present invention is the first optical multiplexer/demultiplexer wherein the first optical waveguide is provided along a straight line, and the second optical waveguide has a portion provided along a curved line.

A third optical multiplexer/demultiplexer of the present invention is the first or second optical multiplexer/demultiplexer wherein the third optical waveguide is provided along a straight line.

A fourth optical multiplexer/demultiplexer in accordance with the present invention comprises a plurality of sets each of which includes the first optical waveguide, the second optical waveguide, the third optical waveguide and the optical filter.

That is, the fourth optical multiplexer/demultiplexer in accordance with the present invention is any of the first to third optical multiplexer/demultiplexers further comprising another first optical waveguide, another second optical waveguide, another third optical waveguide and another optical filters. Here, the other first optical waveguide is provided on a first side of a member, which has a first side and a second side defined by a groove, and has one end exposed to the groove. The other second optical waveguide is provided on the first side and has one end exposed to the groove. The other third optical waveguide is provided on the second side, and has one end exposed to the groove. The other optical filter is inserted in the groove. The other first optical waveguide or the other second optical waveguide is provided along a straight line. The other first optical waveguide and the other third optical waveguide are optically connected with each other by transmission of the other optical filter. The other first optical waveguide and the other second optical waveguide are optically connected with each other by reflection of the other optical filter.

A fifth optical multiplexer/demultiplexer in accordance with the present invention is the fourth optical multiplexer/demultiplexer wherein the other first optical waveguide is formed along a straight line, and the other second optical waveguide has a portion formed along a curved line.

A sixth optical multiplexer/demultiplexer in accordance with the present invention is the fourth or fifth optical multiplexer/demultiplexer wherein the other third optical waveguide is provided along a straight line.

A seventh optical multiplexer/demultiplexer of the present invention is any of the fourth to sixth optical multiplexer/demultiplexers wherein the optical waveguides on the same side with respect to the optical filter are formed on a common member.

That is, the seventh optical multiplexer/demultiplexer of the present invention is any of the fourth to sixth optical multiplexer/demultiplexers wherein the member on which the first optical waveguide, the second optical waveguide and the third optical waveguide are formed and the member on which the other first optical waveguides, the other second optical waveguides and the other third optical waveguides are formed are a common member.

An eighth optical multiplexer/demultiplexer of the present invention is any of the fourth to seventh optical multiplexer/demultiplexers characterized in that the optical filters are formed integrally for the plurality of sets. That is, the eighth optical multiplexer/demultiplexer of the present invention is any of the fourth to seventh optical multiplexer/demultiplexers wherein the optical filter and the other optical filter are integrated with each other.

A ninth optical multiplexer/demultiplexer of the present invention is any of the fourth to eighth optical multiplexer/demultiplexers characterized in that optical axes of the respective optical waveguides on the same side with respect to the optical filter are parallel to each other in the region near an end face of the member. That is, the ninth optical multiplexer/demultiplexer of the present invention is any of fourth to eighth optical multiplexer/demultiplexers, in which the first optical waveguide, the second optical waveguide, the other first optical waveguides and the other second optical waveguides are parallel to each other in the region in a vicinity of an end face of the first side, and the third optical waveguide and the other third optical waveguides are parallel to each other in a region near an end face of the second side.

A tenth optical multiplexer/demultiplexer in accordance with the present invention is any of the first to ninth optical multiplexer/demultiplexers, in which a planar shape of the first surface of the member is a rectangular shape having a first edge facing to the optical filter, a second edge opposite to the first edge and third and fourth edges parallel to each other, and with respect to the optical waveguide formed straightly out of the first optical waveguide and the second optical waveguide, the third edge and the fourth edge are parallel to each other and the second edge is perpendicular thereto.

An eleventh optical multiplexer/demultiplexer in accordance with the present invention is any of the first to ninth optical multiplexer/demultiplexers wherein a planar shape of the first surface of the member is a rectangular shape having a first edge facing to the optical filter, a second edge opposite to the first edge and the third and fourth edges parallel to each other, and with respect to the optical waveguide formed straightly among the first optical waveguide and the second optical waveguide, the third and fourth edges are parallel and the second edge is parallel to the first edge.

The optical communication system in accordance with the present invention is an optical communication system for transmitting optical signals including a plurality of wavelengths, comprising any of the above-described first to eleventh optical multiplexer/demultiplexers in accordance with the present invention, wherein the optical signals are multiplexed or demultiplexed by the optically multiplexer/demultiplexer. Further, it is preferred that an optical signal of a first wavelength among the multiwavelength optical signals is guided in one optical waveguide straightly formed among the first and second optical waveguides; and in the other optical waveguide, an optical signal of a second wavelength shorter than the first wavelength in the multiwavelength optical signals is guided.

DESCRIPTION OF THE PREFERRED EMBODIMENTS

Hereinafter, best modes for carrying out the present invention will be described in detail with reference to the accompanying drawings. In the descriptions of the drawings, identical elements will be given with identical reference symbols, and redundant descriptions therefore will be omitted.

First Embodiment of the Optical multiplexer/Demultiplexer

Figure 1:
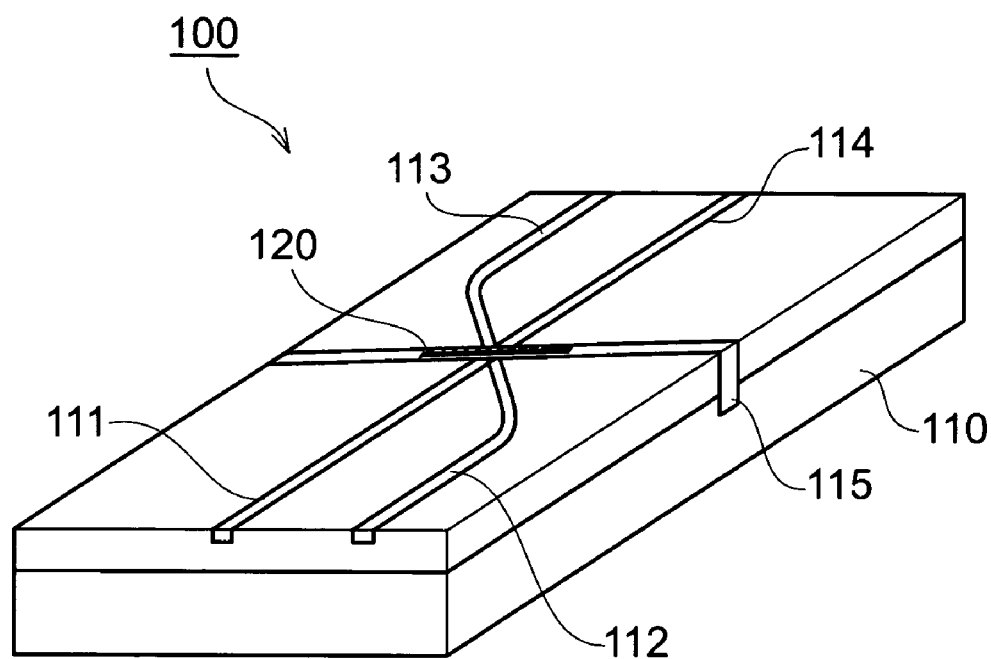
FIG. 1 is a perspective view of an optical multiplexer/demultiplexer 100 in accordance with a first embodiment.
Figure 2:
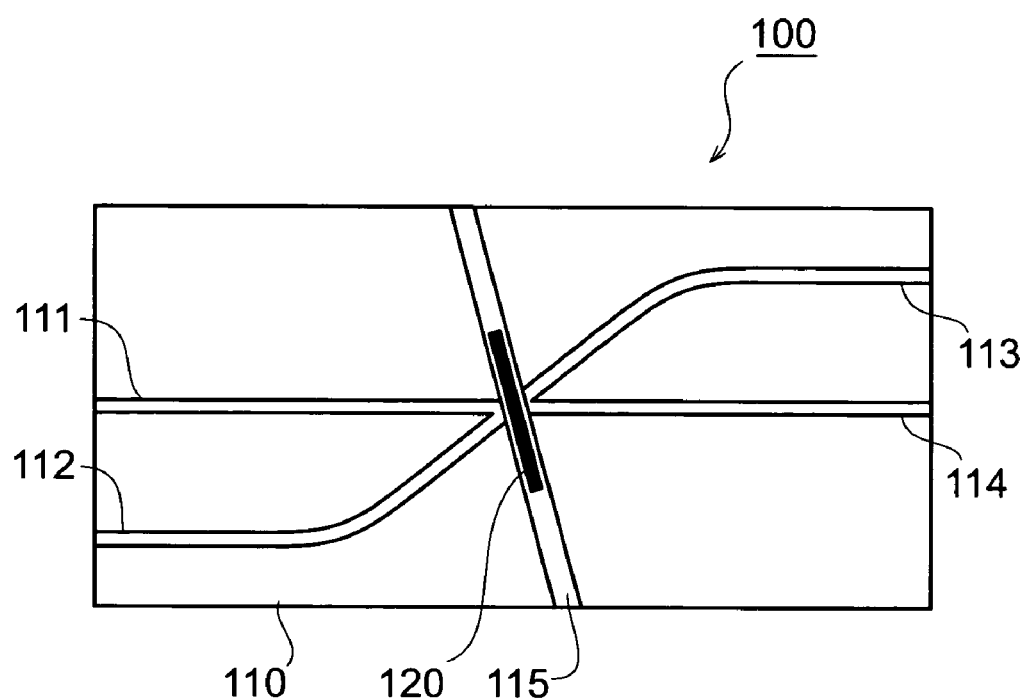
FIG. 2 is a plan view of the optical multiplexer/demultiplexer 100 in accordance with the first embodiment.

First of all, a first embodiment of an optical multiplexer/demultiplexer in accordance with the present invention will be described. FIG. 1 is a perspective view of an optical multiplexer/demultiplexer 100 in accordance with the first embodiment. FIG. 2 is a plan view of the optical multiplexer/demultiplexer 100 in accordance with the first embodiment. The optical multiplexer/demultiplexer 100 shown in these figures includes a member 110 with optical waveguides 111 to 114 and a groove 115 formed thereon, and an optical filter 120 inserted in the groove 115.

The member 110 is a planar optical waveguide with the optical waveguides 111 to 114 formed on one surface thereof, and the groove 115 is formed the surface. Before the groove 115 is formed, the optical waveguide 111 and the optical waveguide 114 are a continuous optical waveguide, and the optical waveguide 112 and the optical waveguide 113 are a continuous optical waveguide. The straight groove 115 is formed so as to go through an intersecting point of the two continuous optical waveguides. The member 110 is, for example, a member consisted of quartz glass or silicon, on which a clad consisted of quartz glass and a core consisted of a quartz glass added with $GeO_2$ are formed. The core serves as the optical waveguide.

The optical waveguides 111 and 112 are formed so as to reach to the groove 115 on a first side with respect to the groove 115 on the member 110. The optical waveguides 113 and 114 are formed so as to reach to the groove 115 on a second side with respect to the groove 115 on the member 110. That is, each end face of the optical waveguides 111, 112, 113 and 114 is exposed to the groove 115. The optical waveguides 111 and 114 are straight on the member 110. On the other hand, the optical waveguides 112 and 113 have a curved portion on the member 110. That is, the optical waveguides 111 and 114 is formed along a straight line. The optical waveguides 112 and 113 have a portion along a curved line.

The optical filter 120 inserted in the groove 115 is a dielectric multilayered filter, and is fixed with an adhesive agent in the groove 115. The optical filter 120 allows a light component of a certain wavelength $\lambda_T$ to transmit, and reflects a light component of another wavelength $\lambda_R$. For example, the transmission wavelength $\lambda_T$ is 1.55 μm; and the reflection wavelength $\lambda_R$ is 1.31 μm and 1.49 μm, but not limited thereto.

For example, among light components included in light which have been guided through the optical waveguide 111 and outputted to the groove 115, the optical filter 120 guides a light component of wavelength $\lambda_T$ which has been transmitted by the optical filter 120, to the optical waveguide 114, and guides a light component of wavelength $\lambda_R$ which has been reflected by the optical filter 120, to the optical waveguide 112. That is, in this case, the optical multiplexer/demultiplexer 100 is capable of demultiplexing the light component of wavelength $\lambda_T$ and the light component of wavelength $\lambda_R$.

Also, for example, the optical filter 120 allows the light component of wavelength $\lambda_T$ which have been guided through the optical waveguide 114 and outputted to the groove 115, to transmit and guides the light component of wavelength $\lambda_T$ to the optical waveguide 111. Also, the optical filter 120 reflects the light component of wavelength $\lambda_R$ which has been guided through the optical waveguide 112 and outputted to the groove 115 and guides the light component of wavelength $\lambda_R$ to the waveguide 111. That is, the optical multiplexer/demultiplexer 100 is capable of multiplexing the light component of wavelength $\lambda_T$ and the light component of wavelength $\lambda_R$.

Since the optical multiplexer/demultiplexer 100 has two optical waveguides formed on each side of the optical filter 120, the optical multiplexer/demultiplexer 100 can be used in various modes. However, on one side, only one optical waveguide may be formed.

Generally, in an optical waveguide having a curved shape, the longer a wavelength of a guided light component is, the larger a propagation loss becomes. However, in the optical multiplexer/demultiplexer 100, the optical waveguides 111 and 114 are formed straightly. Therefore, when using the optical multiplexer/demultiplexer 100, it is preferred to arrange so that the light component of longer wavelength is guided in the straight optical waveguides 111 and 114; and the light component of shorter wavelength is guided in the optical waveguides 112 and 113 having a curved portion, thereby the loss in the optical multiplexing/demultiplexing can be reduced.

The distance between the end face of the optical waveguide 111, 112 and the optical filter 120 in the groove 115 is preferably 3 μm or less; also, the distance between the end face of the optical waveguide 113, 114 and the optical filter 120 in the groove 115 is preferably 3 μm or less, thereby the loss at the optical multiplexing/demultiplexing can be reduced.

Further, each mode field diameter of the optical waveguides 111 to 114 in the groove 115 is preferably larger than the mode field diameter of an ordinary single mode fiber; for example, preferably 20 μm or more. As described above, by setting the mode field diameter of the optical waveguide at the end face facing to the optical filter 120 to be large, the influence of the diffraction at the optical filter 120 can be reduced; thus, the loss at multiplexing and demultiplexing the light components can be reduced. Practically, it is necessary to select an optimum value with respect to the mode field diameter of the optical waveguide at the end face by carrying out light propagation analysis, and by taking into consideration the incident angle of the light components with respect to the optical filter 120, the loss in the optical waveguide and the influence of the higher mode.

The planar shape of the side of member 110 on which the optical waveguides 111 and 112 are formed is a rectangular shape, which has a first edge facing to the optical filter 120 (the edge at the groove 115 side), a second edge at the opposite side to the first edge, and third and fourth edges parallel to each other. With respect to the optical waveguide 111, which is straightly formed, the third edge and the fourth edge are parallel and the second edge is perpendicular thereto. Further, the first edge is not parallel to the second edge. In this case, at the edge face of the member, since the linear optical waveguide 111 is perpendicular to the edge face, it is convenient for connecting, for example, an optical fiber and the optical waveguide 111 to each other. The planar shape of the side of the member 110 on which the optical waveguides 113 and 114 are formed is also the same as the above.

Second Embodiment of the Optical Multiplexer/Demultiplexer

Figure 3:
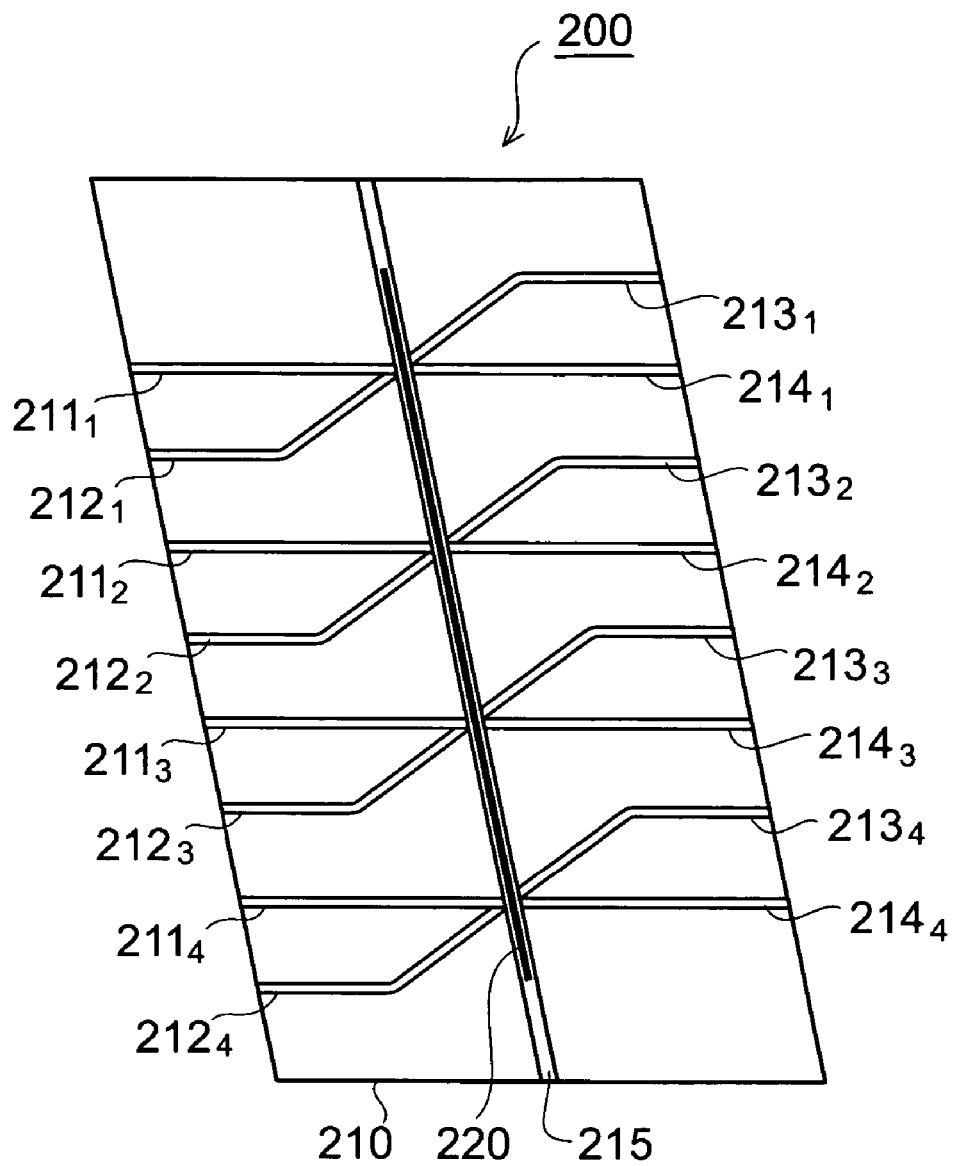
FIG. 3 is a plan view of an optical multiplexer/demultiplexer 200 in accordance with a second embodiment.

Next, a second embodiment of the optical multiplexer/demultiplexer in accordance with the present invention will be described. FIG. 3 is a plan view of an optical multiplexer/demultiplexer 200 in accordance with the second embodiment. The optical multiplexer/demultiplexer 200 shown in FIG. 3 has a configuration in which four sets of the optical multiplexer/demultiplexers are disposed in parallel with each other. The optical multiplexer/demultiplexer 200 includes a member 210 and an optical filter 220.

The member 210 is a planar optical waveguide in which optical waveguides $211_1$ to $211_4$, $212_1$ to $212_4$, $213_1$ to $213_4$ and $214_1$ to $214_4$ are formed on one surface thereof, and a groove 215 is formed the surface. Before the groove 215 is formed, the optical waveguide $211_n$ and the optical waveguide $214_n$ are a continuous optical waveguide; and the optical waveguide $212_n$ and the optical waveguide $213_n$ are a continuous optical waveguide. Here, a suffix n is an arbitrary integer of 1 or more and 4 or less. The straight groove 215 is formed so as to go through the intersecting point of these two continuous optical waveguides. The member 210, for example, is a member wafer consisted of quartz glass or silicon, on which a clad consisted of quartz glass and a core consisted of a quartz glass added with $GeO_2$ are formed. The core serves as the optical waveguide.

On the member 210, the optical waveguides $211_n$ and $212_n$ are formed so as to reach to the groove 215 on a first side with respect to the groove 215. The optical waveguides $213_n$ and $214_n$ are formed so as to reach to the groove 215 on a second side with respect to the groove 215 on the member 210. That is, each end face of the optical waveguides $211_n$, $212_n$, $213_n$ and $214_n$ is exposed to the groove 215. The optical waveguides $211_n$ and $214_n$ are straight on the member 210. On the other hand, the optical waveguides $212_n$ and $213_n$ have a curved portion respectively on the member 210. That is, the optical waveguides $211_n$ and $214_n$ are formed along a straight line. The optical waveguides $212_n$ and $213_n$ have a portion along a curved line respectively.

The optical filter 220 inserted in the groove 215 is a dielectric multilayered filter, and is fixed in the groove 215 with an adhesive agent. The optical filter 220 allows a light component of certain wavelength $\lambda_T$ to transmit, and reflects a light component of other wavelength $\lambda_R$. For example, the transmission wavelength $\lambda_T$ is 1.55 μm; and the reflection wavelength $\lambda_R$ is 1.31 μm and 1.49 μm, but not limited thereto.

In the optical multiplexer/demultiplexer 200, the optical waveguides $211_n$, $212_n$, $213_n$ and $214_n$ and the optical filter 220 of each set have substantially the same structure and operates substantially in the same manner as the optical multiplexer/demultiplexer 100.

On one member 210, 16 optical waveguides $211_1$ to $211_4$, $212_1$ to $212_4$, $213_1$ to $213_4$ and $214_1$ to $214_4$ are formed. Owing to this, the manufacturing cost per channel on the member 210 can be reduced. The optical filter 120 may be formed individually for each set, but the optical filter 120 is preferably formed integrally for four sets. In the latter case, the optical multiplexer/demultiplexer 200 can be manufactured at low cost.

On the member 210, 8 optical waveguides $211_1$ to $211_4$ and $212_1$ to $212_4$ are preferably formed so that the respective optical axes are parallel with each other and arranged at constant intervals at the end face. Also, on the member 210, 8 optical waveguides $213_1$ to $213_4$ and $214_1$ to $214_4$ are preferably formed so that the respective optical axes are parallel with each other and arranged at constant intervals at the end face. In this case, the member 210 and an optical fiber array can be connected being aligned with each other as a whole.

The planar shape of the member 210 on the side on which optical waveguides $211_n$ and $212_n$ are formed is a rectangular shape, which has a first edge (the edge at the groove 215 side) facing to the optical filter 220, a second edge at the side opposite to the first edge, and third and fourth edges parallel to each other. The third edge and the fourth edge are parallel to the optical waveguides $211_n$ which is formed straightly; and the second edge is parallel to the first edge. In this case, waveguide length of each of the optical waveguides $211_1$ to $211_4$ can be set to a specific value, and the waveguide length of each of the optical waveguides $212_1$ to $212_4$ can be also set to a specific value. The shape of the member 210 on the side on which optical waveguides $213_n$ and $214_n$ are formed is rectangular in plan view is the same as the above.

First Embodiment of the Optical Communication System

Figure 4:
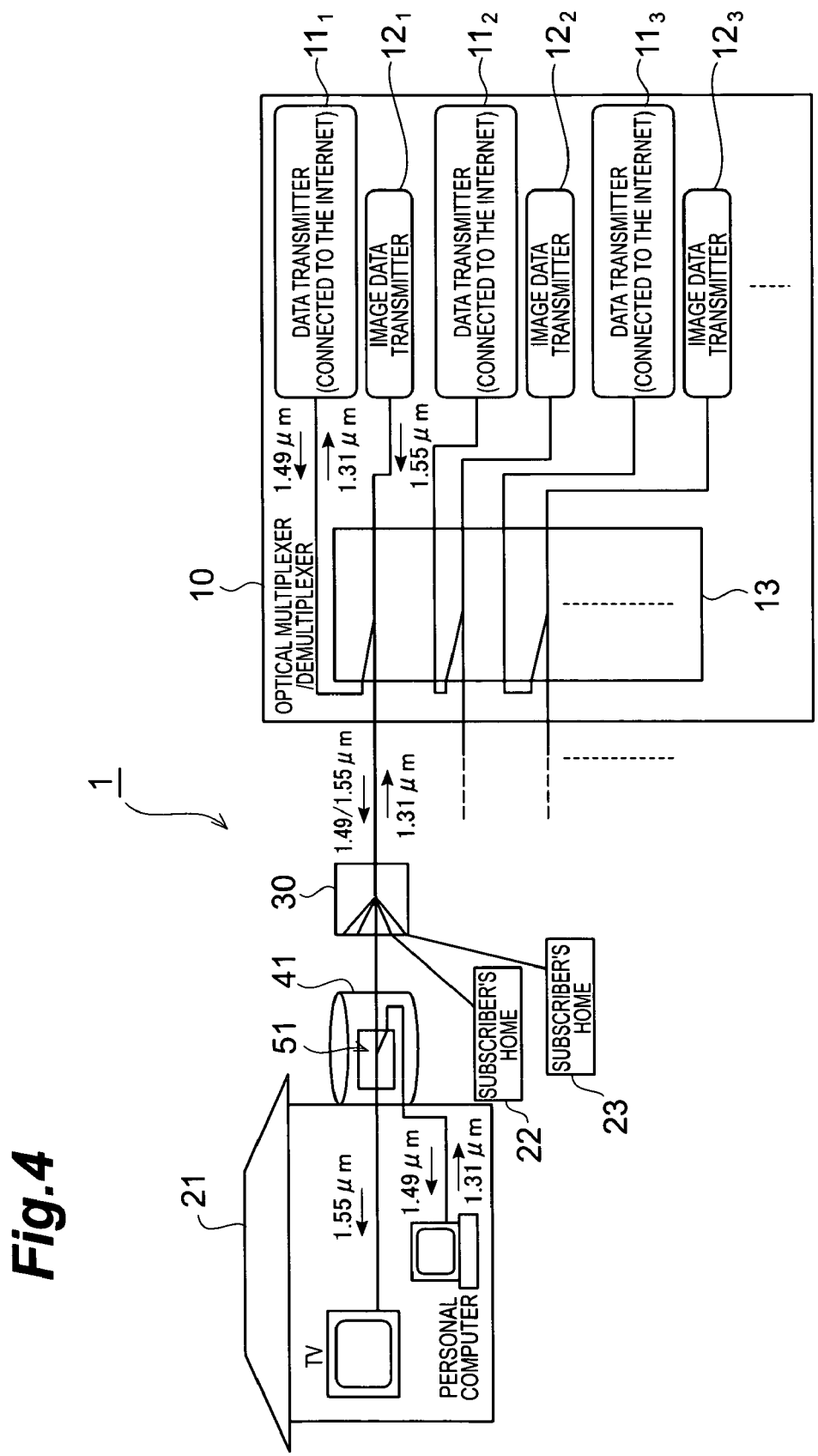
FIG. 4 is a configuration diagram of an optical communication system 1 in accordance with a first embodiment.

Next, a first embodiment of an optical communication system in accordance with the present invention will be described. FIG. 4 is a diagram showing a configuration of an optical communication system 1 in accordance with the first embodiment. The optical communication system 1 shown in FIG. 4 is an FTTH (fiber to the home) system, which performs bidirectional transmission and reception of optical signals between a station 10 and subscriber's homes 21 to 23.

In the station 10, data transmitters $11_1$ to $11_3$, image data transmitters $12_1$ to $12_3$ and an optical multiplexer/demultiplexer 13 are provided. Each of the data transmitters $11_1$ to $11_3$ is connected to the Internet, and performs transmission and reception of digital data with the subscriber's homes 21 to 23. Each of the image data transmitters $12_1$ to $12_3$ transmits image signals (analogue data) to the subscriber's homes 21 to 23. The wavelength of the optical signals sent from the subscriber's homes 21 to 23 to the data transmitters $11_1$ to $11_3$ is 1.31 μm; the wavelength of the optical signals sent from the data transmitters $11_1$ to $11_3$ to the subscriber's homes 21 to 23 is 1.49 μm; and the wavelength of the optical signals sent from the image data transmitters $12_1$ to $12_3$ to the subscriber's homes 21 to 23 is 1.55 μm.

The optical multiplexer/demultiplexer 13 provided in the station 10 multiplexes and demultiplexes optical signals of 3 wavelengths transmitted and received by the data transmitters $11_1$ to $11_3$ and the image data transmitters $12_1$ to $12_3$. The optical multiplexer/demultiplexer according to the above-described embodiments is used for the optical multiplexer/demultiplexer 13. Particularly, the optical multiplexer/demultiplexer 200, in which plurality sets of optical multiplexer/demultiplexers are disposed in parallel, is preferably used.

In the subscriber's home 21, an optical receiver 41 is provided, and in the optical receiver 41, an optical multiplexer/demultiplexer 51 is provided. Other subscriber's homes 22 and 23 are also provided with optical receivers. Further, near the subscriber's homes 21 to 23, a star coupler 30 is provided. The star coupler 30 branches the optical signals (wavelength: 1.49 μm, 1.55 μm) transmitted from the station 10, and transmits the branched optical signals to the subscriber's homes 21 to 23 respectively. The star coupler 30 transmits the optical signals (wavelength: 1.33 μm) transmitted from the subscriber's homes 21 to 23 side to the station 10. The optical multiplexer/demultiplexer 51 multiplexes and demultiplexes optical signals of 3 wavelengths. The optical multiplexer/demultiplexers according to the above-described embodiment is used for the optical multiplexer/demultiplexer 51.

In the optical communication system 1, optical signals (wavelength: 1.49 μm, 1.55 μm), which are outputted from a data transmitter $11_n$ and an image data transmitter $12_n$ respectively are multiplexed by the optical multiplexer/demultiplexer 13 in the station 10 and transmitted therefrom. The optical signals transmitted from the station 10 are branched by the star coupler 30, the branched optical signals are demultiplexed by the optical multiplexer/demultiplexer 51 in the optical receiver 41. One demultiplexed optical signal (wavelength: 1.49 μm) is transmitted to a personal computer in the subscriber's home 21; and the other demultiplexed optical signal (wavelength: 1.55 μm) is transmitted to a TV receiver in the subscriber's home 21. An optical signal (wavelength: 1.33 μm) transmitted from the personal computer in the subscriber's home 21 is received by the data transmitter $11_n$ through the optical multiplexer/demultiplexer 51 and the star coupler 30 in the optical receiver 41 and the optical multiplexer/demultiplexer 13 in the station 10.

In this embodiment, as the optical multiplexer/demultiplexers 13 and 52, the optical multiplexer/demultiplexers of the above-described embodiments are used. Accordingly, a high quality optical signals can be transmitted with small loss at multiplexing and demultiplexing.

Second Embodiment of the Optical Communication System

Figure 5:
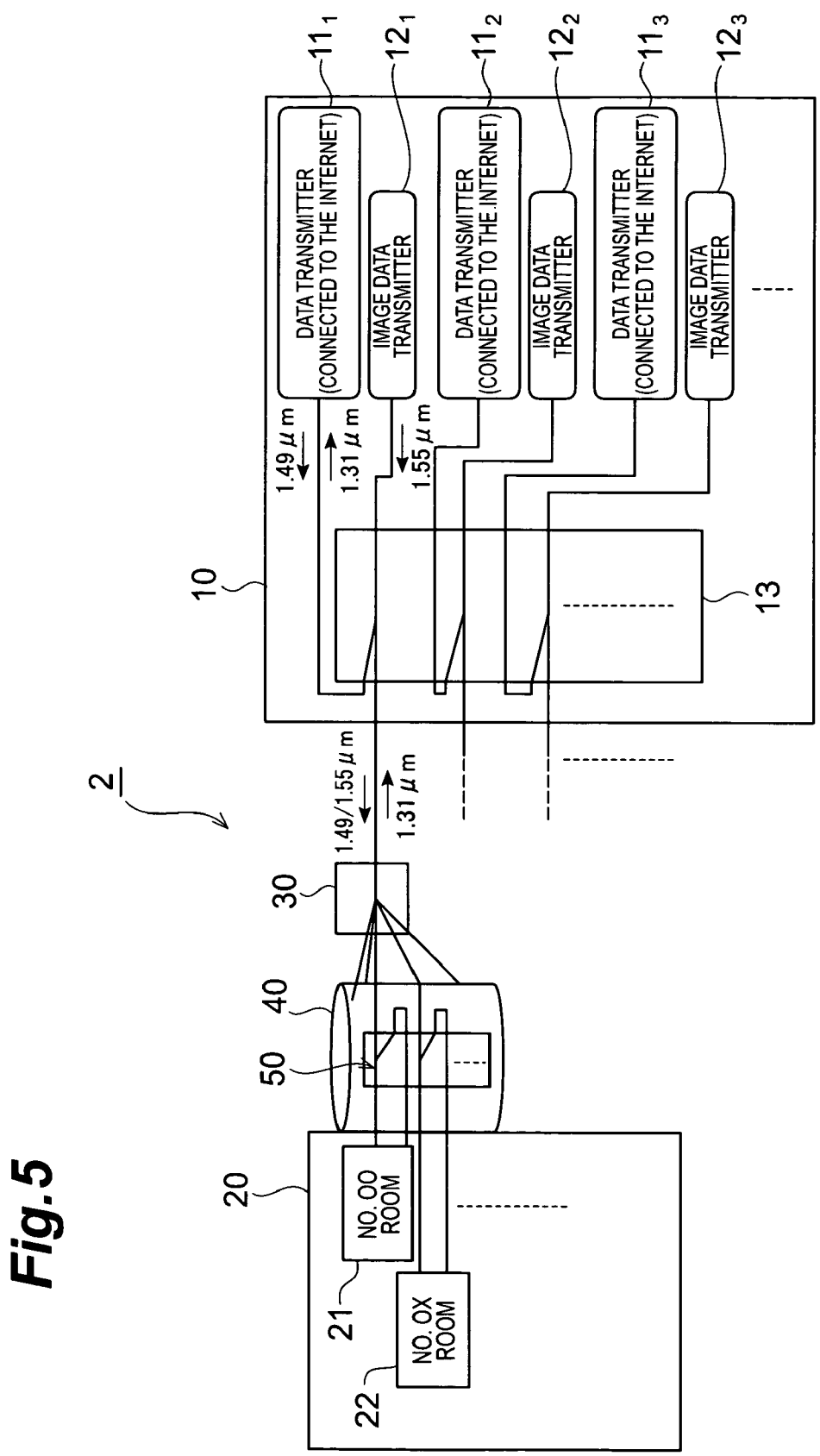
FIG. 5 is a configuration diagram of an optical communication system 2 in accordance with a second embodiment.

Next, a second embodiment of an optical communication system in accordance with the present invention will be described. FIG. 5 is a diagram showing an optical communication system 2 in accordance with the second embodiment. The optical communication system 2 shown in FIG. 5 is an FTTH system, which performs bidirectional transmission and reception of optical signals between a station 10 and subscriber's homes 21, and 22 in a mansion 20. Compared to the optical communication system 1 (FIG. 4) in accordance with the first embodiment, the optical communication system 2 in accordance with the second embodiment is different in the following two points. That is, subscriber's homes 21 and 22 are collective housings in the mansion 20, and one optical receiver 40 is provided for the mansion 20.

In the optical receiver 40 provided in the mansion 20, an optical multiplexer/demultiplexer 50 is provided. The optical multiplexer/demultiplexer 50 multiplexes and demultiplexes optical signals of 3 wavelengths. The optical multiplexer/demultiplexers of the above-described embodiments are applicable to the optical multiplexer/demultiplexer 50. Particularly, the optical multiplexer/demultiplexer 200, in which plural sets of optical multiplexer/demultiplexers are disposed in parallel, are preferably applicable to the optical multiplexer/demultiplexer 50. The star coupler 30 may be provided in the optical receiver 40.

In the optical communication system 2, optical signals (wavelength: 1.49 μm, 1.55 μm) outputted from the data transmitter $11_n$ and the image data transmitter $12_n$ respectively are multiplexed by the optical multiplexer/demultiplexer 13 in the station 10 and transmitted therefrom. The optical signals transmitted from the station 10 are branched by the star coupler 30, and the branched optical signals are demultiplexed by the optical multiplexer/demultiplexer 50 in the optical receiver 40. One demultiplexed optical signal (wavelength: 1.49 μm) is transmitted to personal computers in each subscriber's home; and the other optical signal (wavelength: 1.55 μm) is transmitted to TV receivers in each subscriber's home. An optical signal (wavelength: 1.33 μm) transmitted from a personal computer in each subscriber's home is received by the data transmitter $11_n$ through the optical multiplexer/demultiplexer 50 in the optical receiver 40, the star coupler 30 and the optical multiplexer/demultiplexer 13 in the station 10.

Third Embodiment of the Optical Communication System

Figure 6:
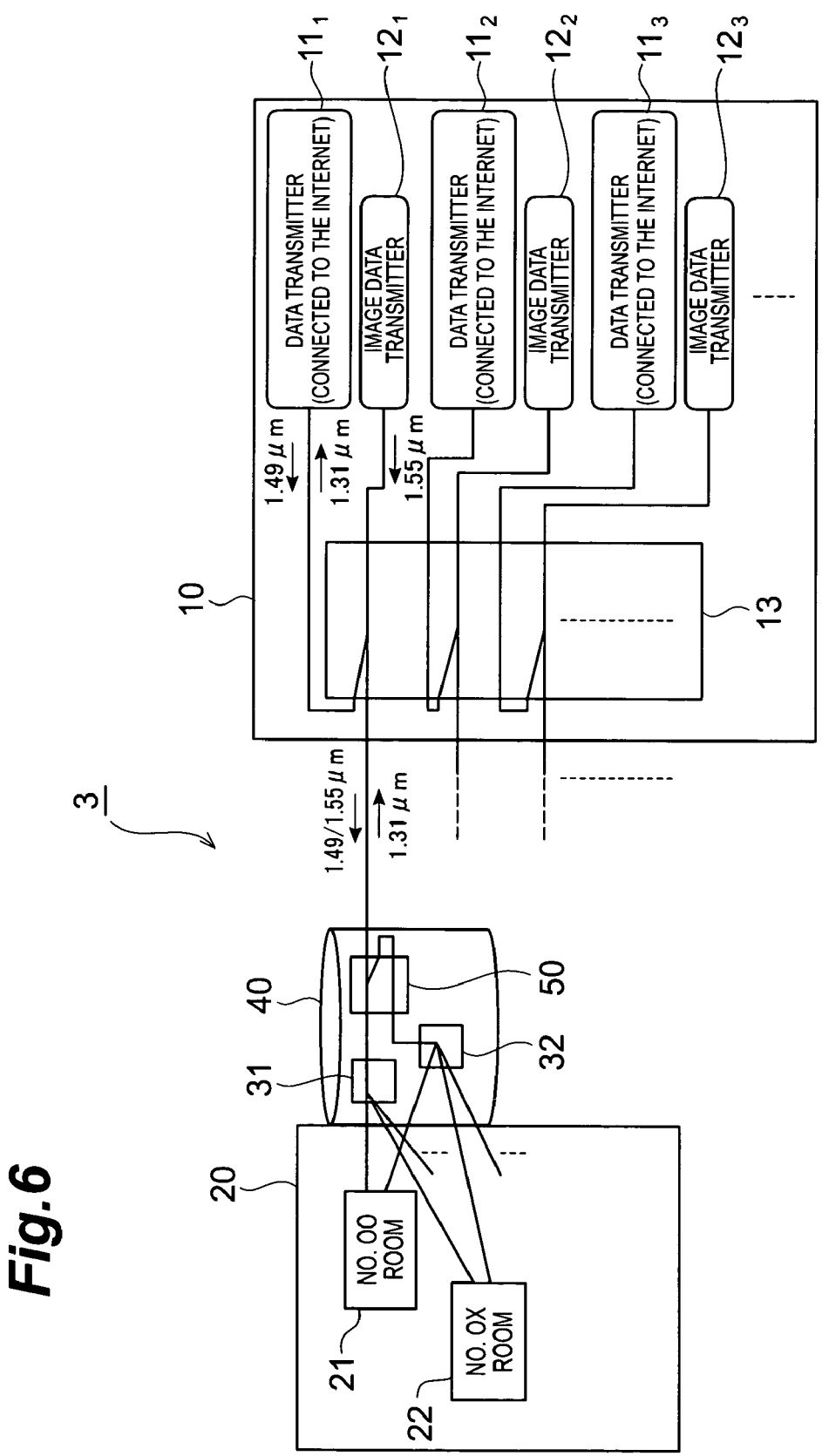
FIG. 6 is a configuration diagram of an optical communication system 3 in accordance with a third embodiment.

Next, a third embodiment of an optical communication system in accordance with the present invention will be described. FIG. 6 is a diagram showing an optical communication system 3 in accordance with the third embodiment. The optical communication system 3 shown in FIG. 6 is an FTTH system, which performs bidirectional transmission and reception of optical signals between a station 10 and subscriber's homes 21, and 22 in a mansion 20. Compared to the optical communication system 2 (FIG. 5) in accordance with the second embodiment, the optical communication system 3 in accordance with the third embodiment is different in the following point. That is, the optical communication system 3 in accordance with the third embodiment is provided with star couplers 31 and 32 and an optical multiplexer/demultiplexer 50 in an optical receiver 40.

In this optical communication system 3, optical signals (wavelength: 1.49 μm, 1.55 μm) outputted from the data transmitter $11_n$ and image data transmitter $12_n$ respectively are multiplexed by the optical multiplexer/demultiplexer 13 in the station 10 and transmitted therefrom. The optical signals transmitted from the station 10 are demultiplexed by the optical multiplexer/demultiplexer 50 in the optical receiver 40. One optical signal (wavelength: 1.49 μm) demultiplexed by the optical multiplexer/demultiplexer 50 is branched by the star coupler 31 and transmitted to personal computers in each subscriber's home, the other optical signal (wavelength: 1.55 μm) is branched by the star coupler 32, and transmitted to TV receivers in each subscriber's home. An optical signal (wavelength: 1.33 μm) transmitted from a personal computer in each subscriber's home is received by the data transmitter $11_n$ through the star coupler 31 in the optical receiver 40, the optical multiplexer/demultiplexer 50 and the optical multiplexer/demultiplexer 13 in the station 10.

Preferred embodiments of the present invention have been described above. As demonstrated in the descriptions of these embodiments, the optical multiplexer/demultiplexer in accordance with the present invention can reduce the loss.

What is claimed is:

1. An optical multiplexer/demultiplexer, comprising:
  a first optical waveguide provided on a first side of a member having the first side and a second side defined by a groove and has one end exposed to the groove;
  a second optical waveguide provided on the first side and has one end exposed to the groove;
  a third optical waveguide provided on the second side and has one end exposed to the groove; and
  an optical filter inserted in the groove, the optical filter transmits a light component of a longer wavelength and reflects a light component of a shorter wavelength,
  wherein in a plan view, the first optical waveguide is provided along a straight line extending from a first edge of the first side of the member to a second edge of the second side of the member, the second edge opposite the first edge,
  the first optical waveguide and the third optical waveguide are optically connected with each other by transmission of the optical filter,
  the first optical waveguide and the second optical waveguide are optically connected with each other by reflection of the optical filter,
  the third optical waveguide is provided along a straight line extending from the second edge to the groove,
  the longer wavelength component propagates in the first optical waveguide and the third optical waveguide and passes through the optical filter, and the transmitted light propagates in the other of the first optical waveguide and the third optical waveguide, and
  the shorter wavelength component propagates in one of the first optical waveguide and the third optical waveguide and is reflected by the optical filter, and the reflected light propagates to the other of the first optical waveguide and the third optical waveguide.

2. The optical multiplexer/demultiplexer according to claim 1, wherein the optical filter is a dielectric multilayered filter.

3. The optical multiplexer/demultiplexer according to claim 1, wherein the first edge faces the optical filter, third and fourth edges are parallel to each other, the third edge and the fourth edge are parallel to each other, and the second edge is perpendicular to the third and fourth edges.

4. The optical multiplexer/demultiplexer according to claim 1, wherein the first edge faces the optical filter, third and fourth edges are parallel to each other, and the second edge is parallel to the first edge.

5. An optical communication system for transmitting optical signals including a plurality of wavelengths, comprising the optical multiplexer/demultiplexer defined in claim 1, wherein the optical signals are multiplexed or demultiplexed by the optical multiplexer/demultiplexer.

6. The optical communication system according to claim 5, wherein an optical signal with a first wavelength among the optical signals is guided to one optical waveguide straightly formed out of the first optical waveguide and the second optical waveguide, and an optical signal with a second wavelength shorter than the first wavelength among the optical signals is guided in the other optical waveguide.

7. The optical multiplexer/demultiplexer according to claim 1, wherein the second optical waveguide is provided along a line, and this line intersects with the straight line in the groove.

8. The optical multiplexer/demultiplexer according to claim 1, wherein the second optical waveguide is provided along a line, this line intersects with the straight line in the groove, and the second optical waveguide extends from the first edge of the first side of the member to the groove.

9. The optical multiplexer/demultiplexer according to claim 1, wherein the second optical waveguide is provided along a line, this line intersects with the straight line in the groove, and the second optical waveguide extends from the second edge of the second side of the member to the groove.

10. The optical multiplexer/demultiplexer according to claim 1, wherein the plurality of second optical waveguides is provided along a line, this line intersects with the straight line in the groove, and the plurality of second optical waveguides extends from the first edge of the first side of the member to the groove.

11. The optical multiplexer/demultiplexer according to claim 1, wherein the plurality of second optical waveguides is provided along a line, this line intersects with the straight line in the groove, and the plurality of second optical waveguides extends from the second edge of the second side of the member to the groove.

12. An optical multiplexer/demultiplexer, comprising:
a plurality of first optical waveguides provided on a first side of a member having the first side and a second side defined by a groove, each first optical waveguide having one end exposed to the groove;
a plurality of second optical waveguides provided on the first side, each second optical waveguide having one end exposed to the groove;
a plurality of third optical waveguides provided on the second side, each third optical waveguide having one end exposed to the groove; and
an optical filter inserted in the groove, the optical filter transmits a light component of a longer wavelength and reflects a light component of a shorter wavelength,
wherein in a plan view, the plurality of first optical waveguides are provided along a straight line extending from a first edge of the first side of the member to a second edge of the second side of the member, the second edge opposite the first edge,
the plurality of first optical waveguides and the plurality of third optical waveguides are optically connected with each other by transmission of the optical filter,
the plurality of first optical waveguides and the plurality of second optical waveguides are optically connected with each other by reflection of the optical filter,
the third optical waveguide is provided along a straight line extending from the second edge to the groove,
the longer wavelength component propagates in the plurality of first optical waveguides and the plurality of third optical waveguides and passes through the optical filter, and the transmitted light propagates in the other of the plurality of first optical waveguides and the plurality of third optical waveguides, and
the shorter wavelength component propagates in one of the plurality of first optical waveguides and the plurality of third optical waveguides and is reflected by the optical filter, and the reflected light propagates to the other of the plurality of first optical waveguides and the plurality of third optical waveguides.

13. The optical multiplexer/demultiplexer according to claim 12, wherein the plurality of second optical waveguides provided on the second side are formed in a curved line.

14. The optical multiplexer/demultiplexer according to claim 12, wherein in the plan view, the plurality of third optical waveguides are provided along a straight line extending from the second edge to the groove.

15. The optical multiplexer/demultiplexer according to claim 12, wherein the optical filter and the other optical filter are integrated with each other.

16. The optical multiplexer/demultiplexer according to claim 12, wherein in the plan view, the plurality of first optical waveguides, and the plurality of second optical waveguides, are parallel with each other on the first side, and
the plurality of third optical waveguides are parallel with each other on the second side.

17. The optical multiplexer/demultiplexer according to claim 12, wherein the plurality of second optical waveguides is provided along a line, and this line intersects with the straight line in the groove.

* * * * *